United States Patent [19]

Johnston

[11] 4,273,604

[45] Jun. 16, 1981

[54] HEAT BONDING DEVICE

[76] Inventor: Orin B. Johnston, 5548 W. 78th St., Edina, Minn. 55435

[21] Appl. No.: 73,147

[22] Filed: Sep. 6, 1979

Related U.S. Application Data

[63] Continuation-in-part of Ser. No. 827,668, Aug. 25, 1977, abandoned, which is a continuation-in-part of Ser. No. 697,746, Jun. 21, 1976, abandoned, which is a continuation of Ser. No. 499,449, Aug. 22, 1974, Pat. No. 3,964,958, which is a continuation-in-part of Ser. No. 326,534, Jan. 24, 1973, abandoned.

[51] Int. Cl.³ .......................................... B29C 17/00
[52] U.S. Cl. .................... 156/382; 100/93 P; 100/211; 100/296; 156/285; 156/498; 156/583.3; 156/583.4
[58] Field of Search ............... 156/228, 272, 285, 286, 156/288, 380, 381, 382, 498, 583.3, 583.4; 100/93 P, 211, 212, 295, 296, 297; 219/243, 541, 548, 549; 425/405, 407, 408, 411, 420

[56] References Cited

U.S. PATENT DOCUMENTS

| | | | |
|---|---|---|---|
| 2,698,273 | 12/1954 | Miner et al. | 156/498 |
| 3,480,505 | 11/1969 | Donnell et al. | 156/498 |

*Primary Examiner*—Caleb Weston
*Attorney, Agent, or Firm*—William R. Hulbert

[57] ABSTRACT

Apparatus for bonding heat bondable materials through the application of pressure and heat employs a diaphragm pressed by fluid pressure against the materials. The diaphragm comprises a web having a flexible heating element which is bonded to its non-material pressing side and has a configuration corresponding to the desired seam configuration. The web carries heat dissipating means to conduct heat away from the diaphragm and the materials in the seam configuration and heat directing means to conduct heat from the element to the seam area. Preferably the heating element, heat directing means and heat conducting means are formed from metallic foil bonded to both sides of the web and having portions etched away to provide electrically insulating channels separating one from another.

6 Claims, 5 Drawing Figures

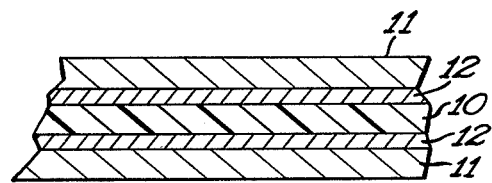
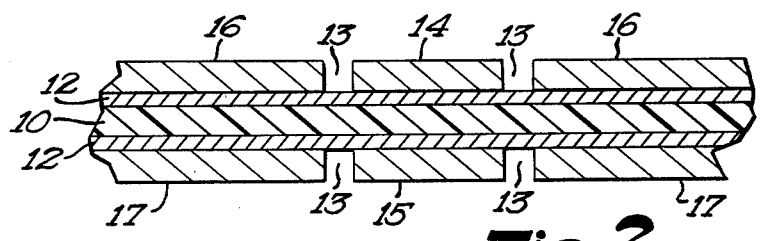
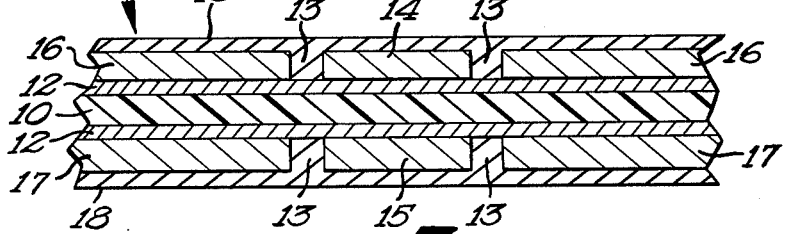
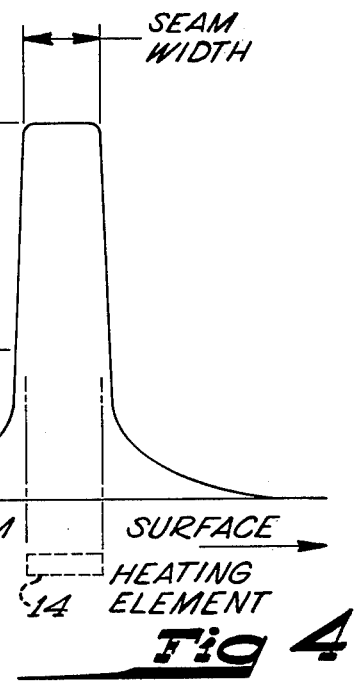
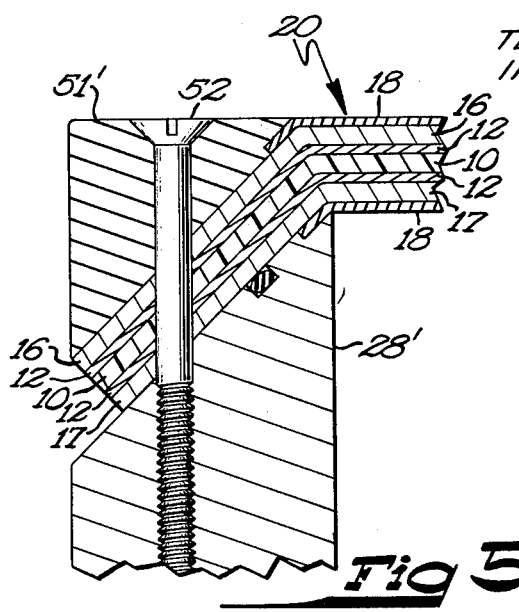

HEAT BONDING DEVICE

CROSS REFERENCE TO RELATED APPLICATIONS

This is a continuation-in-part of application Ser. No. 827,668, filed Aug. 25, 1977, abandoned, which is in turn a continuation-in-part of application Ser. No. 697,746, filed June 21, 1976 abandoned, which is a continuation of application Ser. No. 499,449, filed Aug. 22, 1974, now U.S. Pat. No. 3,964,958, issued June 22, 1976, which is a continuation-in-part of application Ser. No. 326,534, filed Jan. 24, 1973, now abandoned.

BACKGROUND OF THE INVENTION

The use of a diaphragm, formed of a flexible web carrying a heating element, for the application of pressure and heat to bond heat bondable material is disclosed in my U.S. Pat. No. 3,964,958, issued June 22, 1976, which is hereby incorporated by reference and hereinafter referred to as "said patent."

In said patent, a pressure chamber is formed by a cavity closed by a diaphragm. The materials to be bonded are supported on a supporting surface and the diaphragm is brought into contact with the materials over an area larger than the intended bond area by flexing the same convexly by regulated pressure applied by fluid in the pressure chamber. A heating element is carried by the diaphragm inside the pressure chamber cavity, on the non-material engaging side thereof, to apply bonding heat to the materials through the diaphragm. The configuration of the heating element defines the bonding configuration.

The system of said patent eliminates extrusion of the bond area which is inherent in typical die bonding systems. The strength of the bond approaches that of the material itself. The heating element employed is preferably a thin ribbon bonded to the web and is compatible with those bonding techniques known as resistance and impulse bonding, as well as that variously known as dielectric, electronic, high frequency or radio bonding.

In implementing the invention of said patent, it has been discovered that some applications may require a more precise heat control in the bond area and adjacent areas. For example, while a complete bond having the strength of the material in which it is formed is easily accomplished with the system of said patent, a more precise heat control will allow the strength of that bond to be more readily controlled so as to provide bonds that will pull apart with a predetermined force less than the strength of the materials. Such a bond is desirable in many packaging applications. Additionally, by precisely controlling the temperature in the bond area and adjacent areas, the bond width is precisely controlled and is affected very little by the duration of heat application. Also, it has been found that making electrical contact with the heating element at a point where it is bonded to the web increases the mass of the heated components at that location and alters the heat pattern that would otherwise be produced by the heating element. Further, the system of said patent requires careful material selection such that the coefficients of expansion of the heating element and web are as compatible as possible to minimize the forces generated upon heating of the heating element and expansion of the heating element and web.

SUMMARY OF THE INVENTION

The present invention provides in apparatus for joining heat bondable materials by the application of heat and pressure along a predetermined seam area by means of a flexible diaphragm pressed by fluid pressure which flexes its material engaging side convexly against the materials, the diaphragm comprising a web carrying permanently bonded thereto on its non-material pressing side a flexible heating element adapted to apply heat through the web to the area while the diaphragm is so pressed, and heat dissipating means distinct from the heating element carried by the web for dissipating heat from the diaphragm and the materials in the area adjacent the seam area. In preferred embodiments, the web carries on its material pressing side heat directing means having a configuration corresponding to the desired seam configuration and located opposite the heating element for directing heat therefrom to the seam area; the heat dissipating means comprises heat conducting means carried by the web at locations adjacent to and spaced from both the heating element and the heat directing means; a heat sink is provided thermally connected to the heat dissipating means which may include a pressure chamber having side walls defining a cavity spanned by the diaphragm and engaging the heat dissipating means so as to comprise said heat sink; the mutually spaced heating element, heat directing means and heat conducting means are formed from metallic foil bonded to the web and having portions etched away to provide electrically insulating channels separating each from the other; and the metallic foil may be bonded to both sides of the web, the channels therein on one side being located opposite corresponding channels on the other side.

BRIEF DESCRIPTION OF THE DRAWINGS

FIGS. 1-3 show in cross-section the method of fabrication of a preferred embodiment of the present invention;

FIG. 4 is a temperature profile of the diaphragm assembly of FIG. 3; and

FIG. 5 illustrates the cooperation of the diaphragm of FIGS. 1-3 with the pressure chamber of said patent.

DESCRIPTION OF PREFERRED EMBODIMENT

Referring now to FIG. 1, there is shown a laminate employed to fabricate a diaphragm in accordance with the present invention. A suitable base 10 (see said patent for material choices) has metal foils 11 bonded to it by a suitable bonding material 12. The bonding material 12 may be a polytetrafluoroethylene, a silicone elastomer, or any other adhesive suitable for use within the intended environment.

Referring now to FIG. 2, the metal foils 11 are chemically etched at 13 to form a heating element 14 and a heat director 15 on opposing faces of the base 10. The remainder of the metal foil laminated to the base 10 form heat dissipators 16 and 17 whose function will be described more fully below. The laminate of FIG. 2 is encapsulated on both faces with a material 18 to provide a diaphragm of uniform thickness with the channels 13 formed by the etching of the metal foil being filled (see FIG. 3).

In both resistance and impulse modes of bonding, heat is generated by heating element 14 as a result of passing an electric current through it. In the resistance mode, the temperature of the heating element 14 is maintained at temperature below the bonding temperature, and increased during a bonding cycle by pulsing a high current through it. In either case, the heat generated by the heating element 14 moves by conduction in all directions through the diaphragm assembly of FIG. 3. Assuming a base 10 made of Kapton (a DuPont polyimide), metal foils made of Nichrome V, and silicone bonding and encapsulating materials 12 and 18, the coefficient of thermal conductivity of the metal elements 15, 16 and 17 is twenty-five to thirty times greater than it is for the base 10, one hundred eighty-five to one hundred ninety times greater than it is for the bonding material 12, and approximately twenty-five times greater than it is for the encapsulating material 18. Thus, the thermal director 15 increases the thermal conductance of the path from the heating element 14 to the area immediately below the director 15 (the desired bonding area). Also, the heat dissipating members 16 and 17 substantially restrict a temperature rise outside of that area immediately below the heat director 15 as a result of their relatively high thermal conductivity. Thus, heat is applied to the area of the desired bond or seam configuration and dissipated in the area adjacent that area. Although the base 10 has a higher specific heat than the metal parts 15–17, its thermal conductance is small relative to the metal parts which results in a relatively small amount of heat moving laterally into the base 10 where the temperature gradient is lower than is the temperature gradient between the base 10 and the heat dissipators 16 and 17. Therefore, the heat flows into the dissipators 16 and 17 substantially nullifying the tendency of the base 10 to increase in temperature and store thermal energy. The same analysis holds for the bonding and encapsulating materials 12 and 18.

As discussed above, the thermodynamics of the assembly of FIG. 3 are established by the choice of materials and the design geometry to provide thermal energy to the bond area sufficient to bond the materials in that area with a steep thermal gradient on each side of the bond area. This is illustrated by the temperature profile of FIG. 4 wherein the abscissa represents the diaphragm surface and the ordinate represents temperature. In the profile of FIG. 4, a heating element is centrally positioned on the diaphragm surface. The temperature profile of the assembly of FIG. 3, as illustrated in FIG. 4, enables the device to precisely and uniformly make seams, in thermoplastic films, of uniform width and strength with the fusion bond as strong as the film or selectively controlled to make seams that can be pulled apart with a predetermined force.

Referring now to FIG. 5, there is shown the manner in which the diaphragm 20 of the present invention, as illustrated in FIG. 3, may be employed within the apparatus of said patent. With specific reference to FIG. 11 of said patent, FIG. 5 shows a pressure chamber side wall 28' having an upper beveled edge. A clamp ring 51' is placed on the beveled edge of the side wall 28' the upper surface of the clamp ring 51' will be generally horizontal. The clamp ring 51' is bored to accept a bolt 52, while the side wall 28' is tapped to accept the threads of the bolt 52. To assemble a pressure chamber in accordance with the preferred embodiment of FIG. 5, a diaphragm 20 made in accordance with the embodiment of FIG. 3 is laid across the pressure chamber cavity to lie atop the beveled edge of the side wall 28'. The encapsulating material 18 terminates such that the dissipators 16 and 17 engage the clamp ring 51' and side wall 28', respectively, with the clamp ring 51' positioned over the diaphragm. The bolt 52 extends through the bores of the clamp ring 51' and into the threads of the side wall 28'. Before the clamp ring 51' is tightened by means of the bolt 52, the diaphragm 10 can be placed under tension to any desired degree of tautness, in known manner. While the diaphragm 20 is maintained taut, the bolts 52 are then tightened causing the clamp ring 51' to engage the diaphragm 20 and maintain its position and tautness.

As discussed above, the heat dissipators 16 and 17 conduct heat away from the intended bond area. As such, they operate as a heat sink. This heat sink operation is facilitated by the contact between the thermal dissipators 16 and 17 with the ring 51' and side wall 28' such that the ring 51' and side wall 28' act as additional heat sinks in the conduction of heat away from the intended bond area.

Electrical contact with a heating element bonded to the web may be made by suitable leads, not shown, making suitable connections to the heating element 14. Projecting ends of the foil comprising heating element 14 may be used for such leads.

Obviously, many modifications and variations of the present invention are possible in light of the above teachings. Accordingly, it is to be understood, that within the scope of the appended claims, the invention may be practiced otherwise than as specifically described.

I claim:

1. In apparatus for joining heat bondable materials by the application of heat and pressure along a predetermined seam area by means of a flexible diaphragm one side of which is pressed by fluid pressure which flexes its material engaging side convexly against the materials, said diaphragm comprising a web carrying permanently bonded thereto on its non-material pressing side a flexible heating element adapted to apply heat through the web to said area while the diaphragm is so pressed and heat dissipating means carried by the web for dissipating heat from the diaphragm and the materials in the area adjacent the seam area, the improvement wherein said web carries on its material pressing side heat directing means having a configuration corresponding to the desired seam configuration and located opposite said heating element for directing heat therefrom to the seam area.

2. Apparatus according to claim 1 wherein said heat dissipating means comprises heat conducting means carried by the web at locations adjacent to and spaced from both said heating element and said heat directing means.

3. Apparatus according to claim 2 wherein at least some of said mutually spaced heating element, heat directing means and heat conducting means are formed from metallic foil bonded to the web and having portions etched away to provide electrically insulating channels separating each from the other.

4. Apparatus according to either claim 1 or claim 2 including a heat sink thermally connected to said heat dissipating means.

5. Apparatus according to claim 4 further comprising a pressure chamber having side walls defining a cavity spanned by said diaphragm and engaging said heat dissipating means so as to comprise said heat sink.

6. Apparatus according to claim 3 wherein said metallic foil is bonded to both sides of said web and the channels therein on one side are located opposite corresponding channels on the other side.

* * * * *